(12) United States Patent
Fine et al.

(10) Patent No.: US 11,100,897 B2
(45) Date of Patent: Aug. 24, 2021

(54) METHOD AND ELECTRONIC DEVICE FOR VERIFYING A CHARACTER TO BE DISPLAYED ON A SCREEN COMPARED TO A REFERENCE CHARACTER, ASSOCIATED COMPUTER PROGRAM PRODUCT AND GRAPHICS PROCESSOR

(71) Applicant: THALES, Courbevoie (FR)

(72) Inventors: Alexandre Fine, Merignac (FR); Philippe Neto, Merignac (FR); Siegfried Rouzes, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/905,518

(22) Filed: Jun. 18, 2020

(65) Prior Publication Data

US 2020/0410959 A1   Dec. 31, 2020

(30) Foreign Application Priority Data

Jun. 25, 2019 (FR) ..................... 19 06865

(51) Int. Cl.
*G09G 5/24* (2006.01)
*G09G 5/32* (2006.01)
*G09G 5/36* (2006.01)

(52) U.S. Cl.
CPC .............. *G09G 5/24* (2013.01); *G09G 5/32* (2013.01); *G09G 5/363* (2013.01); *G09G 2340/045* (2013.01); *G09G 2340/0464* (2013.01); *G09G 2340/0492* (2013.01); *G09G 2380/12* (2013.01)

(58) Field of Classification Search
CPC ...... G09G 5/24; G09G 5/32; G09G 2340/045; G09G 2340/0464; G09G 2340/0492; G09G 2380/12
See application file for complete search history.

(56) References Cited

U.S. PATENT DOCUMENTS

2002/0105515 A1   8/2002   Mochizuki

FOREIGN PATENT DOCUMENTS

| JP | 2016-076093 A | | 5/2016 |
|----|---------------|---|--------|
| JP | 2016076093 A | * | 5/2016 |

OTHER PUBLICATIONS

French Search Report issued in corresponding International Application FR1908065 dated Apr. 24, 2020.

* cited by examiner

*Primary Examiner* — Jeffery A Brier
(74) *Attorney, Agent, or Firm* — Arent Fox LLP

(57) ABSTRACT

The invention relates to a method for verifying a character to be displayed on a screen, compared to a reference character. The character to be displayed and the reference character each comprise at least several characteristic points. The method comprises:

a) determining a barycenter of the characteristic points of the character to be displayed, b) computing geometric coordinates of each characteristic point of the character to be displayed in a coordinate system centered on the determined barycenter, and c) computing a deviation between the character to be displayed and the reference character, as a function of the geometric coordinates computed for the character to be displayed and predetermined geometric coordinates for the reference character.

The character to be displayed is considered correct only if the computed deviation is below the predetermined threshold.

10 Claims, 3 Drawing Sheets

[Fig 1]
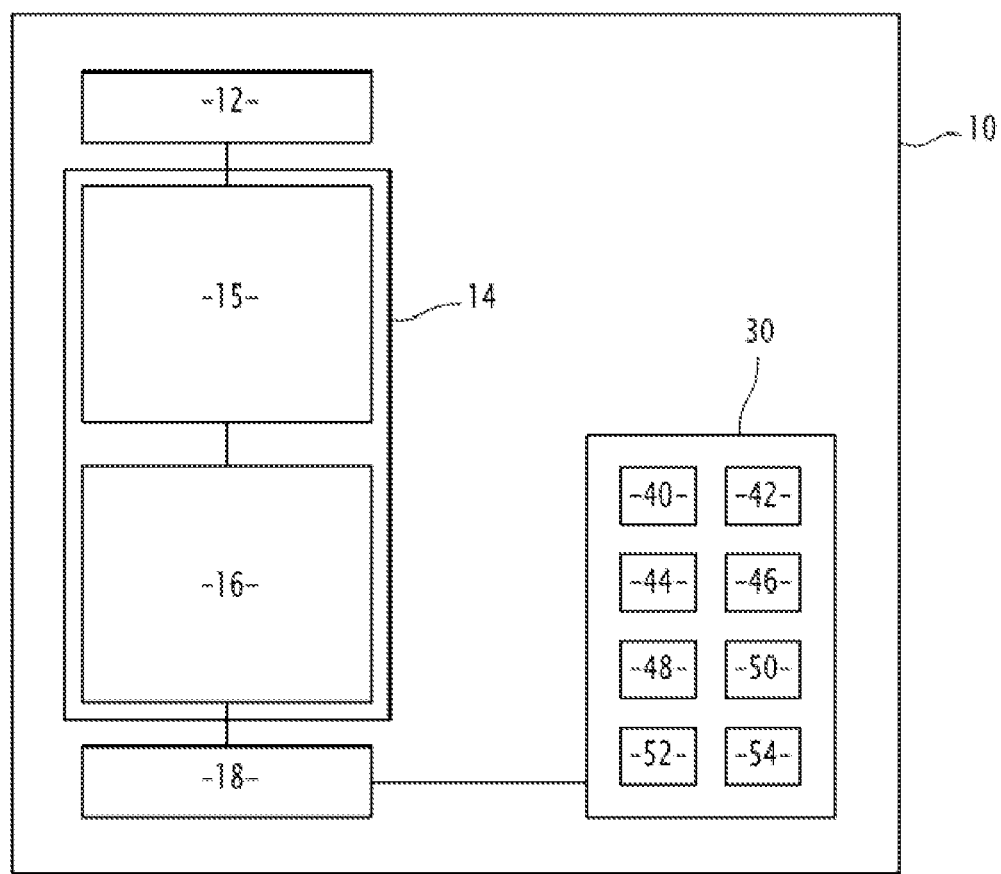

[Fig 2]
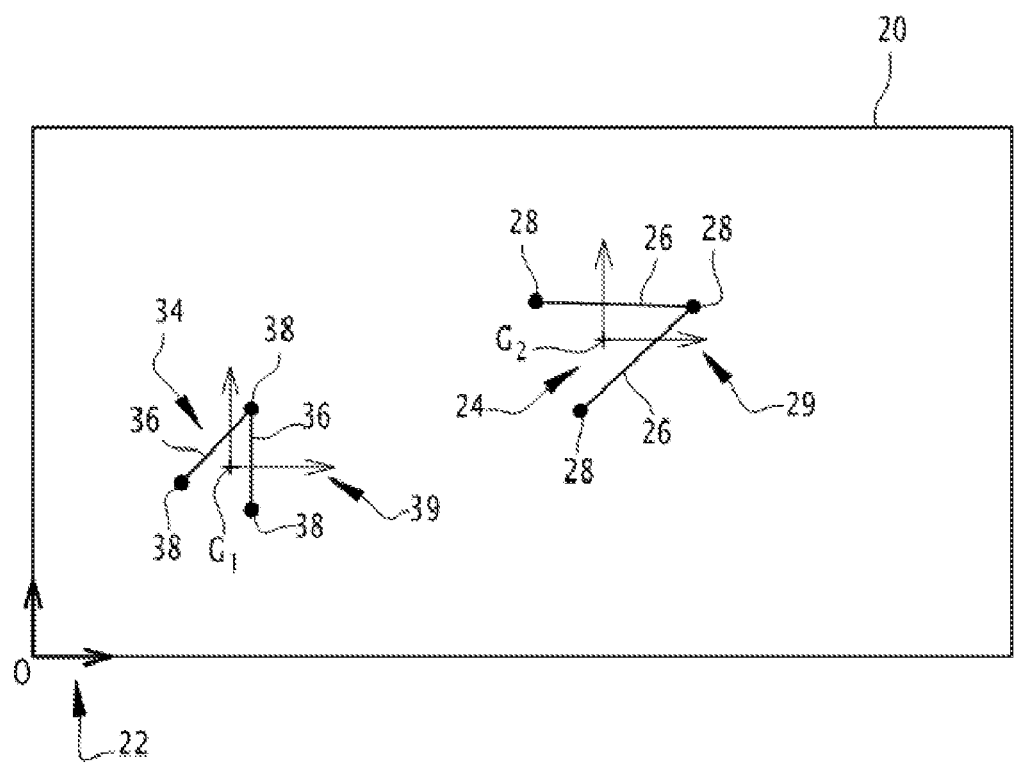

[Fig 3]
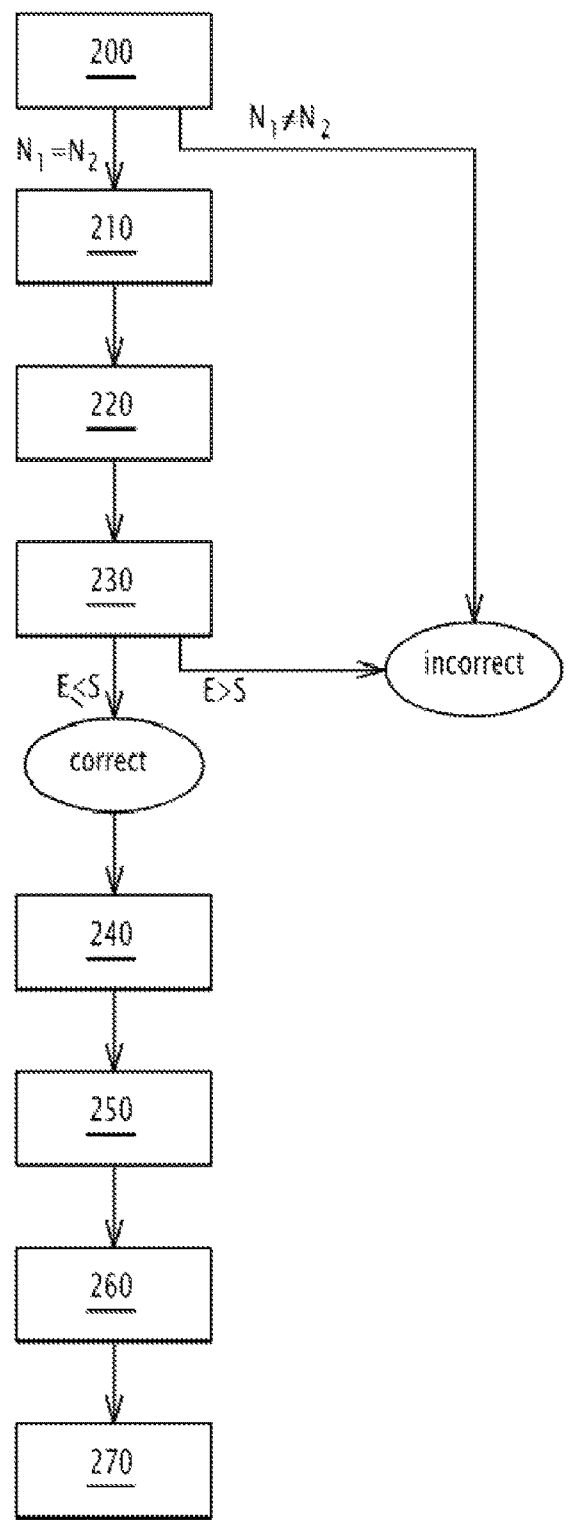

METHOD AND ELECTRONIC DEVICE FOR VERIFYING A CHARACTER TO BE DISPLAYED ON A SCREEN COMPARED TO A REFERENCE CHARACTER, ASSOCIATED COMPUTER PROGRAM PRODUCT AND GRAPHICS PROCESSOR

CROSS-REFERENCE TO RELATED APPLICATIONS

This application is a U.S. non-provisional application claiming the benefit of French Application No. 19 06865, filed on Jun. 25, 2019, which is incorporated herein by reference in its entirety.

FIELD OF THE INVENTION

The present invention relates to a method and electronic device for verifying a character to be displayed on a screen compared to a reference character.

The invention also relates to a non-transitory computer-readable medium including a computer program product comprising software instructions which, when executed by a computer, implement such a verification method.

The invention also relates to a graphics processor comprising such an electronic verification device.

The invention relates to the field of data display systems, preferably suitable for being embedded in an aircraft, in particular in an aircraft cockpit.

The invention in particular relates to the field of graphics processors included in these display systems, these graphics processors also being called GPU (Graphic Processing Unit). Such graphics processors are typically made in the form of one or several dedicated integrated circuits, such as one or several ASIC (Application-Specific Integrated Circuit).

BACKGROUND OF THE INVENTION

A graphics processor of the aforementioned type is then known in particular making it possible to display characters on a monitoring screen of an aircraft in order to assist with the piloting of the aircraft.

However, in case of error of the graphics processor, the characters may be incorrectly displayed on the screen. The graphics processor can also display an incorrect character.

SUMMARY OF THE INVENTION

The aim of the invention is then to propose a method and an electronic verification device allowing a precise verification of a character to be displayed on a screen.

To that end, the invention relates to a method for verifying a character to be displayed on a screen, compared to a reference character. The character to be displayed and the reference character each comprise at least several characteristic points to be displayed on the screen. The method is characterized in that it comprises the following steps: determining a barycenter of the characteristic points of the character to be displayed; computing geometric coordinates of each characteristic point of the character to be displayed in a coordinate system centered on the determined barycenter; and computing a deviation between the character to be displayed and the reference character, as a function of the computed geometric coordinates for the character to be displayed and predetermined geometric coordinates for the reference character, said predetermined geometric coordinates being characteristic point geometric coordinates of the reference character in a coordinate system centered on a barycenter of its characteristic points. The character to be displayed is considered correct only if the computed deviation is below a predetermined threshold.

Such a verification method makes it possible to verify that a character to be displayed on a screen is correct relative to a reference character, irrespective of the position, the size and the orientation of the character to be displayed on the screen. Indeed, using the barycenter of each character as center of a coordinate system makes it possible to obtain geometric coordinates of the characteristic points that are comparable to one another, and computing the deviation between the character to be displayed and the reference character makes it possible to verify whether the characteristic points of the character to be displayed are positioned correctly, which makes it possible to ensure that its display is correct, if the computed deviation is below the predetermined threshold, irrespective of its position, size and orientation.

According to other advantageous aspects, the verification method includes one or more of the following features:
- the method further comprises the following steps, after the step for computing the geometric coordinates: computing a geometric transformation between one character among the character to be displayed and the reference character, and the other character among the character to be displayed and the reference character; determining a position on the screen of the character to be displayed, as a function of the computed geometric transformation and a predetermined position of the reference character; and determining an orientation on the screen of the character to be displayed, as a function of the computed geometric transformation and a predetermined orientation of the reference character,
- the method further comprises, after the step for computing the geometric transformation, a step for determining a size on the screen of the character to be displayed, as a function of the computed geometric transformation and a size of the predetermined reference character,
- the method comprises, before the step for determining the barycenter, a step for comparing the number of characteristic points of the character to be displayed and that of the reference character, the character to be displayed being considered incorrect and the next steps not being carried out, if the number of characteristic points of the character to be displayed differs from that of the reference character,
- during the step for computing the deviation, the deviation between the character to be displayed and the reference character is computed as a function of a root mean square error between the geometric coordinates of the characteristic points of the character to be displayed and those of the characteristic points of the reference character,
- the character to be displayed is the image of a geometric transformation of the reference character, the geometric transformation being a direct similarity, the number of characteristic points of the character to be displayed and the number of characteristic points of the reference character are equal, and the root mean square error verifies one of the following equations $$E_q = \sqrt{\frac{S_2 + s_2 - 2\sigma}{N}}$$

if the geometric transformation is a translation;

$$E_q = \sqrt{\frac{S_2 + s_2 - 2\rho}{N}}$$

if the geometric transformation is a rotation, or a combination of a translation and a rotation; and $$E_q = \sqrt{\frac{S_2 - \rho/\lambda}{N}}$$

if the geometric transformation is a change of scale; or a combination of a change of scale, and a translation and/or a rotation; with $S_2=\Sigma_{1\leq i\leq N}(X_i^2+Y_i^2)$; $s_2=\Sigma_{1\leq i\leq N}(x_i^2+y_i^2)$; $\sigma=\Sigma_{1\leq i\leq N}(x_iX_i+y_iY_i)$; $\rho=\sqrt{\sigma^2+\kappa^2}$; $\kappa=\Sigma_{1\leq i\leq N}(y_iX_i-x_iY_i)$; and $\lambda=s_2/\rho$; N representing the number of characteristic points of each character, $x_i$ and $y_i$ being the geometric coordinates of an $i^{th}$ characteristic point among the characteristic points of the characteristic to be displayed, and $X_i$ and $Y_i$ being the geometric coordinates of an $i^{th}$ characteristic point among the characteristic points of the reference character, and the character to be displayed and the reference character each comprise at least one segment to be displayed on the screen, the characteristic points of said character corresponding to end of the at least one segment The invention also relates to a non-transitory computer-readable medium including a computer program product comprising software instructions which, when executed by a computer, implement a verification method as defined above.

The invention also relates to an electronic device for verifying a character to be displayed on a screen compared to a reference character. The character to be displayed and the reference character each comprise several characteristic points to be displayed on the screen. The verification device being characterized in that it comprises the unit for determining a barycenter of the characteristic points of the character to be displayed; a first unit for computing geometric coordinates of each characteristic point of the character to be displayed in a coordinate system centered on the determined barycenter; and a second unit for computing a deviation between the character to be displayed and the reference character, as a function of the computed geometric coordinates for the character to be displayed and predetermined geometric coordinates for the reference character, said predetermined geometric coordinates being geometric coordinates of characteristic points of the reference character in a coordinate system centered on a barycenter of its characteristic points. The character to be displayed is considered correct only if the computed deviation is below a predetermined threshold.

The invention also relates to a graphics processor comprising an electronic verification device, as defined above.

BRIEF DESCRIPTION OF THE DRAWINGS

These features and advantages of the invention will appear more clearly upon reading the following description, provided solely as a non-limiting example, and done in reference to the appended drawings, in which:

FIG. 1 is a schematic illustration of a graphics processor comprising a verification device according to the invention, FIG. 2 is a schematic illustration of a screen on which a character to be displayed and a reference character are shown, and FIG. 3 is a flowchart of a verification method according to the invention.

DETAILED DESCRIPTION OF PREFERRED EMBODIMENTS

FIG. 1 shows a graphics processor 10, also called GPU (Graphics Processing Unit), comprising a module 12 for acquiring a display command of a character, a module 14 for processing a display of a character from an acquired command, the processing module 14 including a geometric engine 15 and a raster engine 16. The graphics processor 10 comprises a buffer memory 18 connected to the processing module 14.

The graphics processor 10 is for example designed to be integrated into a display system, preferably designed to be embedded in an aircraft, in particular in an aircraft cockpit.

The graphics processor 10 is configured to generate data for display on a screen 20. These data are for example data for displaying character(s) such as alphanumeric characters.

The graphics processor 10 is then configured to generate data for displaying a character in a desired position on the screen 20, and with a desired orientation and size. In a variant, it is configured to generate data for displaying a character in a desired position and with a desired orientation on the screen 20, and with a predefined size. Also in a variant, it is configured to generate data for displaying a character in a desired position and with a defined orientation and size on the screen 20.

Each character for example comprises at least one segment to be displayed on the screen 20. Such characters are then called vector characters.

Furthermore, each character comprises several characteristic points to be displayed on the screen. Preferably, the characteristic points of said character correspond to the ends of the segment(s) of said character. Advantageously, each character comprises, for each end of its segments that is not combined with another end of its segments, a characteristic point corresponding to said end; and for each end of its segments that is combined with another end of its segments, a single characteristic point for said two combined ends.

The screen 20 is, for example, a monitoring screen designed to be embedded in an aircraft, in particular in an aircraft cockpit, as is known in itself.

FIG. 2 is a schematic illustration of the screen 20 with an absolute coordinate system 22, and in which a character to be displayed 24 is shown, comprising segments 26 and characteristic points 28.

As an example, the character to be displayed 24 is any character comprising two segments 26 and three characteristic points 28.

In the example of FIG. 2, the screen has a rectangular shape and the absolute coordinate system 22 is an orthonormal coordinate system with origin O corresponding to an apex of the screen 20.

The absolute coordinates of a pixel refer to the Cartesian coordinates of said pixel in the absolute coordinate system 22.

The screen 20 is for example configured to display characters, from data generated by the graphics processor 10 comprising absolute coordinates of pixels of the screen 20 to be displayed.

In the example of FIG. 1, the graphics processor is made in the form of programmable logic components, such as one or more FPGA (Field-Programmable Gate Array), or in the form of dedicated integrated circuits of the ASIC (Application-Specific Integrated Circuit) type.

The acquisition module 12 is configured to acquire display commands of the character to be displayed 24, in particular originating from a processor or CPU (Central Processing Unit).

The processing module 14 is connected to the acquisition module 12 and is configured to provide geometric data of the character to be displayed 24, from acquired display commands. For example, the geometric data of the character to be displayed 24 comprise the absolute coordinates of pixels to be displayed on the screen 20 of the or each segment 26 of the character to be displayed 24.

The geometric engine 15, also called GE, is configured to supply geometric data of the segment(s) 26 of the character to be displayed 24, from the acquired display command.

The geometric data of a segment 26 of the character to be displayed 24 for example comprise the absolute coordinates of the characteristic points 28 of the character to be displayed 24 corresponding to the ends of said segment 26.

The raster engine 16, or RE, is connected to the geometric engine 15, and is configured to supply the geometric data of the character to be displayed 24 on the screen 20, in particular the absolute coordinates of the pixels to be displayed of the or each segment 26 of said character 24, from geometric data of the segment(s) 26 of the character to be displayed 24 supplied by the geometric engine 15.

The buffer memory 18 is configured to store the data of the character to be displayed 24 supplied by the processing module 14, these stored data being used to display the character to be displayed 24 on the screen 20.

The graphics processor 10 further comprises an electronic verification device 30 of the character to be displayed 24 on the screen 20 relative to a reference character 34, the verification device 30 being connected to the buffer memory 18.

The verification device 30 is configured to verify that the character to be displayed 24 is correct compared to the reference character 34, that is to say, the character to be displayed 24 is the image of a geometric transformation of the reference character 34, and therefore that the segments 26 and characteristic points 28 are the images by said geometric transformation of segments 36 and characteristic points 38 of the reference character 34. As an example, the reference character 34 is shown in FIG. 2 with two segments 36 and three characteristic points 38.

Hereinafter and as an example, the geometric transformation is a transformation or a combination of transformations among the group made up of a translation, a rotation and a change of scale. The geometric transformation is then a direct similarity.

In the example of FIG. 2, the geometric transformation comprises a translation, a rotation and a change of scale.

The verification device 30 includes a first unit 40 for determining a barycenter G1 of the characteristic points 28 of the character to be displayed 24, a first unit 42 for computing geometric coordinates of each characteristic point 28 of the character to be displayed 24 in a coordinate system 29 centered on the determined barycenter G1, and a second unit 44 for computing a deviation E between the character to be displayed 24 and the reference character 34.

As an optional addition, the verification device 30 further comprises a unit 46 for comparing the number of characteristic points 28 of the character to be displayed 24 and that of the reference character 34.

Also as an optional addition, the verification device 30 further comprises a third unit 48 for computing a geometric transformation between one character among the character to be displayed 24 and the reference character 34, and the other character among the character to be displayed 24 and the reference character 34, and a second unit 50 for determining a position on the screen 20 of the character to be displayed 24, a third unit 52 for determining an orientation on the screen 20 of the character to be displayed 24, and additionally, a fourth unit 54 for determining a size on the screen 20 of the character to be displayed 24.

The first determining unit 40 is configured to determine the barycenter G1 of the characteristic points 28 of the character to be displayed 24, in particular the absolute coordinates $(x_{G1}, y_{G1})$ of the barycenter G1, from geometric data of characters to be displayed that are stored in the buffer memory 18, in particular from absolute coordinates $(x_i^{(a)}, y_i^{(a)})$ of the pixels corresponding to the characteristic points 28, with i ranging from 1 to $N_1$, $N_1$ being the number of characteristic points 28 of the character to be displayed 24.

The first determining unit 40 is for example configured to compute the absolute coordinates $(x_{G1}, y_{G1})$ of the barycenter G1 according to the following equations:

$$x_{G1} = \sum_{1 \leq i \leq N_1} \frac{x_i^{(a)}}{N_1}; \text{ and} \qquad [\text{Math 1}]$$

$$y_{G1} = \sum_{1 \leq i \leq N_1} \frac{y_i^{(a)}}{N_1} \qquad [\text{Math 2}]$$

The first computing unit 42 is configured to compute the geometric coordinates $(x_i, y_i)$ of each characteristic point 28 of the reference character 34 in the coordinate system 29, preferably orthonormal, centered on the determined barycenter G1.

The geometric coordinates $(x_i, y_i)$ of the characteristic points 28 then verify the following equations:

$$x_i = x_i^{(a)} - x_{G1}; \text{ and} \qquad [\text{Math 3}]$$

$$y_i = y_i^{(a)} - y_{G1}. \qquad [\text{Math 4}]$$

The second computing unit 44 is configured to compute the deviation E between the character to be displayed 24 and the reference character 34, as a function of the geometric coordinates $(x_i, y_i)$ computed for the character to be displayed 24 and predetermined geometric coordinates $(X_i, Y_i)$ for the reference character 34. The predetermined geometric coordinates $(X_i, Y_i)$ are geometric coordinates of the characteristic points 38 of the reference character 34 in a coordinate system 39, preferably orthonormal, centered on a barycenter G2 of its characteristic points 38, with i ranging from 1 to $N_2$, $N_2$ being the number of characteristic points 38 of the reference character 34.

For example, the second computing unit 44 is configured so that the deviation E as a function of a root mean square error $E_q$ between the geometric coordinates $(x_i, y_i)$ of the characteristic points 28 of the character to be displayed 24 and those of the characteristic points 38 of the reference character 34, the deviation E preferably being equal to said root mean square error $E_q$.

Preferably, the second computing unit 44 is configured to compute the root mean square error $E_q$ as a function of the geometric transformation between the character to be displayed 24 and the reference character 34, assuming the number $N_1$ of characteristic points 28 of the character to be displayed 24 to be equal to that $N_2$ of the reference character 34, $N=N_1=N_2$ then representing said number of characteristic points 28, 38, according to the following equations:

$$E_q = \sqrt{\frac{S_2 + s_2 - 2\sigma}{N}},\qquad \text{[Math 5]}$$

if the geometric transformation is a translation;

$$E_q = \sqrt{\frac{S_2 + s_2 - 2\rho}{N}}\qquad \text{[Math 6]}$$

if the geometric transformation is a rotation, or a combination of a translation and a rotation;

$$E_q = \sqrt{\frac{S_2 - \rho/\lambda}{N}},\qquad \text{[Math 7]}$$

if the geometric transformation is a change of scale, or a combination of a change of scale, and a translation and/or a rotation;

$$S_2 = \Sigma_{1 \le i \le N}(X_i^2 + Y_i^2) \quad \text{with}\qquad \text{[Math 8]}$$

$$s_2 = \Sigma_{1 \le i \le N}(x_i^2 + y_i^2);\qquad \text{[Math 9]}$$

$$\sigma = \Sigma_{1 \le i \le N}(x_i X_i + y_i Y_i)\qquad \text{[Math 10]}$$

$$\rho = \sqrt{\sigma^2 + \kappa^2}\qquad \text{[Math 11]}$$

$$\kappa = \Sigma_{1 \le i \le N}(y_i X_i + x_i Y_i); \text{ and}\qquad \text{[Math 12]}$$

$$\lambda = s_2/\rho.\qquad \text{[Math 13]}$$

The character to be displayed 24 is considered correct if the computed deviation E is below a predetermined threshold S.

Advantageously, the threshold S is determined, for example via preliminary tests, such that when the computed deviation E is below said threshold S, each characteristic point 28 of the character to be displayed 24 is distant, by a maximum of two pixels along an x-axis of the absolute coordinate system 22 and two pixels along a y-axis of the absolute coordinate system 22, from the image by the geometric transformation of a corresponding characteristic point 38 of the reference character 34.

For example, the first determining 40, and respectively computing 42, units are further configured to determine the barycenter G2 of the characteristic points 38 for a set of reference characters 34 able to be displayed on the screen 20, in particular the absolute coordinates $(X_{G2}, Y_{G2})$ of the barycenter G2, and respectively to compute the geometric coordinates $(X_i, Y_i)$ of each characteristic point 38 for all of the reference characters 34 that can be displayed on the screen 20, in the coordinate system 39, preferably upon starting the graphics processor 10.

As an optional addition, the comparison unit 46 is configured to compare, before the determination of the barycenter G1, the number $N_1$ of characteristic points 28 of the character to be displayed 24 and the number $N_2$ of characteristic points 38 of the reference character 34.

Also as an optional addition, the third computing unit 48 is configured to compute, after computing the geometric coordinates $(x_i, y_i)$ of the characteristic points 28 of the character to be displayed 24, the geometric transformation between one character among the character to be displayed 24 and the reference character 34, and the other character among the character to be displayed 24 and the reference character 34.

In particular, the third computing unit 48 is configured to determine a translation vector between the character to be displayed 24 and the reference character 34. The determined translation vector corresponds to a vector among the barycenter G1 of the character to be displayed 24 and the barycenter G2 of the reference character 34.

In addition, the third computing unit 48 is configured to compute an angle of rotation θ between the character to be displayed 24 and the reference character 34, according to the following equations:

$$\cos\theta = \frac{\sigma}{\rho};\text{ and}\qquad \text{[Math 14]}$$

$$\sin\theta = \frac{\kappa}{\rho};\qquad \text{[Math 15]}$$

where σ is defined according to [Math 10], ρ according to [Math 11] and κ according to [Math 12].

Also in addition, the third computing unit 48 is configured to compute a scaling factor λ between the character to be displayed 24 and the reference character 34, according to equation [Math 13].

The second determining unit 50 is configured to determine the position of the reference character 24, as a function of the computed geometric transformation, in particular as a function of the determined translation vector, and as a function of a predetermined position of the reference character 34.

The third determining unit 52 is configured to determine the orientation of the reference character 24, as a function of the computed geometric transformation, in particular as a function of the computed angle of rotation θ, and as a function of a predetermined orientation of the reference character 34.

The fourth determining unit 54 is configured to determine the size of the reference character 24, as a function of the computed geometric transformation, in particular as a function of the scaling factor λ, and as a function of a predetermined orientation of the reference character 34.

In a variant that is not shown, the verification device 30 is a device outside the graphics processor 10. According to this variant, the graphics processor 10 comprises a module sending geometric data of the character to be displayed 24 to the verification device 30, and a module receiving verification data from the verification device 30. According to this variant, the verification device 30 is as defined above, and further comprises a unit receiving geometric data of the character to be displayed 24 from the graphics processor 10, and a unit sending verification data to the graphics processor 10.

The verification data comprise data indicating whether the character to be displayed is correct, and as an optional addition, data comprising the position, orientation, and further as an addition, the size of the character to be displayed 24.

The verification device 30 is for example made in the form of programmable logic components, such as one or more FPGA (Field-Programmable Gate Array), or in the form of dedicated integrated circuits of the ASIC type.

In a variant that is not shown, the verification device 30 comprises an information processing unit, including a memory, and a processor associated with the memory. The first determining unit 40, the first and second computing units 42 and 44, as well as, by way of optional addition, the comparison unit 46, the third computing unit 48 and the second, third and fourth determining units 50, 52 and 54, as well as the receiving and sending units, are then each made in the form of software, or a software component, executable by the processor. The memory is then able to store first software for determining the barycenter G1 of the characteristic points 28 of the character to be displayed 24, first software for computing the geometric coordinates $(x_i, y_i)$ of each characteristic point 28 of the character to be displayed 24, second software for computing the deviation E between the character to be displayed 24 and the reference character 34, and as an optional addition, software for comparing the number $N_1$ of characteristic points 28 of the character to be displayed 24 and the number $N_2$ of characteristic points 38 of the reference character 34, third software for computing the geometric transformation between one character among the character to be displayed 24 and the reference character 34, and the other character among the character to be displayed 24 and the reference character 34, second software for determining the position of the character to be displayed 24, third software for determining the orientation of the character to be displayed 24, and fourth software for determining the size of the character to be displayed 24, as well as software for receiving geometric data of the character to be displayed 24 from the graphics processor 10 and software for sending verification data to the graphics processor 10.

When the verification device 30 is made in the form of one or several software programs, i.e., in the form of a computer program product, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program product including software instructions is then stored on the readable medium.

A verification method of the character to be displayed 24 on the screen 20 compared to the reference character 34, carried out by the verification device 30, will now be described in light of FIG. 3.

The method comprises a step 210 for determining, via the first determination unit 40, the barycenter G1 of the characteristic points 28 of the character to be displayed 24. During this step 210, the first determining unit 40 computes the absolute coordinates $(x_{G1}, y_{G1})$ of the barycenter G1, from the absolute coordinates $(x^{(a)}, y^{(a)})$ of the characteristic points 28 of the reference character 34, for example, according to equations [Math 1] and [Math 2].

The method next comprises a step 220 for computing, via the first computing unit 42, geometric coordinates $(x_i, y_i)$ of each characteristic point 28 of the character to be displayed 24. During this step 220, the first computing unit 42 computes the geometric coordinates $(x_i, y_i)$ of each characteristic point 28, according to equations [Math 3] and [Math 4].

Lastly, the method comprises a step 230 for computing, via the second computing unit 44, the deviation E between the character to be displayed 24 and the reference character 34.

During the computing step 230, the second computing unit 44 computes the deviation E, preferably as a function of the root mean square error $E_q$, for example according to equation [Math 7].

In a variant, when the graphics processor 10 is configured to display a character with a predefined size, the second computing unit 44 computes the deviation E as a function of the root mean square error $E_q$, according to equation [Math 6].

Also in a variant, when the graphics processor 10 is configured to display a character with a predefined orientation and size, the second computing unit 44 computes the deviation E as a function of the root mean square error $E_q$, according to equation [Math 5].

The character to be displayed 24 is considered correct only if the computed deviation E is below the predetermined threshold S.

As an optional addition, the method comprises, prior to the determining step 210, a step 200 for comparison, by the comparison unit 46, of the number $N_1$ of characteristic points 28 of the character to be displayed 24 and the number $N_2$ of characteristic points 38 of the reference character 34.

The following determination step 210 is next carried out, only if the number $N_1$ of characteristic points 28 of the character to be displayed 24 and that $N_2$ of the reference character 34 are equal.

The character to be displayed 24 is considered incorrect and the next steps are not carried out, if the number $N_1$ of characteristic points 28 of the character to be displayed 24 differs from the number $N_2$ of characteristic points 38 of the reference character 34.

Also as an optional addition, the method comprises, after the computing step 220, a step 240 for computing, via the third computing unit 48, the geometric transformation between one character among the character to be displayed 24 and the reference character 34, and the other character among the character to be displayed 24 and the reference character 34.

During step 240, the third computing unit 48 for example computes the translation vector as a function of the computed barycenter G1, the angle of rotation $\theta$ according to equations [Math 14] and [Math 15] and the scaling factor $\lambda$ of the geometric transformation according to equation [Math 13].

In a variant, when the graphics processor 10 is configured to display a character with a predefined size, the third computing unit 48 computes only the translation vector and the angle of rotation $\theta$.

Also in a variant, when the graphics processor 10 is configured to display a character with a predefined orientation and size, [sic] computes only the translation vector.

The method then comprises a step 250 for determining, via the second determining unit 50, the position on the screen 20 of the character to be displayed 24, as a function of the computed geometric transformation, in particular of the computed transformation vector, and as a function of the predetermined position of the reference character 34.

The method further comprises a step 260 for determining, via the third determining unit 52, the orientation on the screen 20 of the character to be displayed 24, as a function of the computed geometric transformation, in particular of the computed angle of rotation $\theta$, and as a function of the predetermined orientation of the reference character 34.

Preferably, the method further comprises, following the determining step 240, a step 270 for computing, via the fourth determining unit 54, the size on the screen 20 of the character to be displayed 24, in particular of the computed scaling factor λ, and as a function of the predetermined size of the reference character 34.

In the example of FIG. 3, step 260 is carried out after step 250 and step 270 is carried out after step 260. In a variant that is not shown, steps 250 to 270 are carried out in any order.

In a variant, when the graphics processor 10 is configured to display a character with a predefined size, step 270 is not carried out.

Also in a variant, when the graphics processor 10 is configured to display a character with a predefined orientation and size, steps 260 and 270 are not carried out.

In the example of FIG. 3, steps 240 to 270 are carried out only after the character to be displayed 24 has been considered correct at the end of step 230.

Alternatively, steps 240 to 270 are carried out between steps 220 and 230.

According to this alternative, during the computing step 230, the second computing unit 44 computes the deviation E as a function of the computed geometric transformation. More specifically, the second computing unit 44 computes the deviation E as a function of the following root mean square error $E_q$:
- equation [Math 7], if the computed scaling factor λ is different from 1, that is to say, if the computed geometric transformation comprises a change of scale.
- equation [Math 6], if the computed scaling factor λ is equal to 1 and the computed angle of rotation θ is different from 0°, that is to say, if the computed geometric transformation comprises only a translation and a rotation, or only a rotation, and
- equation [Math 5], if the computed scaling factor λ is equal to 1 and the computed angle of rotation θ is equal to 0°, that is to say, if the computed geometric transformation comprises only a translation.

In a variant, when the verification device 30 is a device outside the graphics processor 10, the method further comprises a preliminary step, not shown, for receiving, from the graphics processor 10, geometric data of the character to be displayed 24, and a final step, not shown, for sending verification data to the graphics processor 10.

Thus, the verification device 30 according to the invention makes it possible to verify the character to be displayed 24 relative to the reference character 34 just before it is displayed on the screen 20, which makes it possible to guarantee a correct display of this character, irrespective of its position, size and orientation.

Furthermore, computing the position, orientation and size of the character to be displayed 24 makes it possible to verify that the character is displayed in a desired position on the screen 20, and with a desired orientation and size.

Such a verification device 30 then makes it possible to verify the character to be displayed 24 with a limited number of computations, which allows the verification device 30 to verify a large number of characters in a short period of time, for example less than 250 microseconds for 1000 characters when the verification device 30 is a device outside the graphics processor 10.

Additionally, the computation of the deviation E is optimized as a function of the geometric transformation between the character to be displayed 24 and the reference character 34.

The invention claimed is:

1. A method for verifying a character to be displayed on a screen, compared to a reference character,
the character to be displayed and the reference character each comprising several characteristic points to be displayed on the screen,
wherein the method comprises:
a) determining a barycenter of the characteristic points of the character to be displayed,
b) computing geometric coordinates of each characteristic point of the character to be displayed in a coordinate system centered on the determined barycenter, and
c) computing a deviation between the character to be displayed and the reference character, as a function of the computed geometric coordinates for the character to be displayed and predetermined geometric coordinates for the reference character, said predetermined geometric coordinates being geometric coordinates of the characteristic points of the reference character in a coordinate system centered on a barycenter of its characteristic points,
the character to be displayed being considered correct only if the computed deviation is below the predetermined threshold.

2. The method according to claim 1, wherein the method further comprises, after b):
d) computing a geometric transformation between one character among the character to be displayed and the reference character, and the other character among the character to be displayed and the reference character,
e) determining a position on the screen of the character to be displayed, as a function of the computed geometric transformation and a position of the predetermined reference character, and
f) determining an orientation on the screen of the character to be displayed, as a function of the computed geometric transformation and an orientation of the predetermined reference character.

3. The method according to claim 2, wherein the method further comprises, after d), determining a size on the screen of the character to be displayed, as a function of the computed geometric transformation and a size of the predetermined reference character.

4. The method according to claim 1, wherein the method comprises, before a), comparing the number of characteristic points of the character to be displayed and that of the reference character, the character to be displayed being considered incorrect and the next steps not being carried out, if the number of characteristic points of the character to be displayed differs from that of the reference character.

5. The method according to claim 1, wherein, during c), the deviation between the character to be displayed and the reference character is computed as a function of a root mean square error between the geometric coordinates of the characteristic points of the character to be displayed and those of the characteristic points of the reference character.

6. The method according to claim 5, wherein the character to be displayed is the image of a geometric transformation of the reference character, the geometric transformation being a direct similarity, the number of characteristic points of the character to be displayed and the number of characteristic points of the reference character are equal, and the root mean square error verifies one of the following equations:

$$E_q = \sqrt{\frac{S_2 + s_2 - 2\sigma}{N}}$$

if the geometric transformation is a translation, $$E_q = \sqrt{\frac{S_2 + s_2 - 2\rho}{N}}$$

if the geometric transformation is a rotation, or a combination of a translation and a rotation, and $$E_q = \sqrt{\frac{S_2 - \rho/\lambda}{N}}$$

if the geometric transformation is a change of scale, or a combination of a change of scale, and a translation or a rotation, or a combination of a change of scale, a translation, and a rotation,
with $S_2 = \Sigma_{1 \leq i \leq N}(X_i^2 + Y_i^2)$; $s_2 = \Sigma_{1 \leq i \leq N}(x_i^2 + y_i^2)$; $\sigma = \Sigma_{1 \leq i \leq N}(x_i X_i + y_i Y_i)$; $\rho = \sqrt{\sigma^2 + \kappa^2}$; $\kappa = \Sigma_{1 \leq i \leq N}(y_i X_i + x_i Y_i)$; and $\lambda = s_2/\rho$, representing the number of characteristic points of each character, xi and yi being the geometric coordinates of an $i^{th}$ characteristic point among the characteristic points of the characteristic to be displayed, and $X_i$ and $Y_i$ being the geometric coordinates of an $i^{th}$ characteristic point among the characteristic points of the reference character.

7. The method according to claim 1, wherein the character to be displayed and the reference character each comprise at least one segment to be displayed on the screen, the characteristic points of said character corresponding to end of the at least one segment.

8. A non-transitory computer-readable medium including a computer program product comprising software instructions which, when executed by a computer, carry out a method according claim 1.

9. An electronic device for verifying a character to be displayed on a screen, compared to a reference character,
the character to be displayed and the reference character each comprising several characteristic points to be displayed on the screen,
wherein the verification device comprises:
a unit for determining a barycenter of the characteristic points of the character to be displayed,
a first unit for computing geometric coordinates of each characteristic point of the character to be displayed in a coordinate system centered on the determined barycenter, and
a second unit for computing a deviation between the character to be displayed and the reference character, as a function of the computed geometric coordinates for the character to be displayed and predetermined geometric coordinates for the reference character, said predetermined geometric coordinates being geometric coordinates of the characteristic points of the reference character in a coordinate system centered on a barycenter of its characteristic points,
the character to be displayed being considered correct only if the computed deviation is below the predetermined threshold.

10. A graphics processor comprising an electronic verification device, wherein the verification device is according to claim 9.

* * * * *